United States Patent
Hong et al.

(10) Patent No.: US 12,258,279 B2
(45) Date of Patent: Mar. 25, 2025

(54) METHOD FOR RECOVERING LITHIUM PRECURSOR FROM WASTE LITHIUM SECONDARY BATTERY POSITIVE ELECTRODE MATERIAL

(71) Applicant: SK INNOVATION CO., LTD., Seoul (KR)

(72) Inventors: Sukjoon Hong, Daejeon (KR); Jiyun Park, Daejeon (KR); Jeongbae Yoon, Daejeon (KR); Seungok Lee, Daejeon (KR); Jimin Kim, Daejeon (KR); Sungreal Son, Daejeon (KR)

(73) Assignee: SK INNOVATION CO., LTD., Seoul (KR)

( * ) Notice: Subject to any disclaimer, the term of this patent is extended or adjusted under 35 U.S.C. 154(b) by 0 days.

(21) Appl. No.: 18/255,807

(22) PCT Filed: Nov. 30, 2021

(86) PCT No.: PCT/KR2021/017806
§ 371 (c)(1),
(2) Date: Jun. 2, 2023

(87) PCT Pub. No.: WO2022/119262
PCT Pub. Date: Jun. 9, 2022

(65) Prior Publication Data
US 2023/0416103 A1   Dec. 28, 2023

(30) Foreign Application Priority Data
Dec. 2, 2020   (KR) .................. 10-2020-0166203

(51) Int. Cl.
*H01M 10/54*   (2006.01)
*C01D 1/30*   (2006.01)
(Continued)

(52) U.S. Cl.
CPC .............. *C01D 1/30* (2013.01); *H01M 10/54* (2013.01); *H01M 6/52* (2013.01); *H01M 10/052* (2013.01)

(58) Field of Classification Search
CPC ........ H01M 10/54; H01M 6/52; H01M 8/008; H01M 10/052; C01D 1/30
See application file for complete search history.

(56) References Cited

U.S. PATENT DOCUMENTS

| 8,709,126 B1 * | 4/2014 | Luhrs ................ B22F 1/148 75/369 |
| 2016/0028105 A1 * | 1/2016 | Khalifah ........... C04B 35/62675 423/302 |

(Continued)

FOREIGN PATENT DOCUMENTS

| CN | 101499547 A | 8/2009 |
| CN | 108649291 A | 10/2018 |

(Continued)

OTHER PUBLICATIONS

Extended European Search Report for the European Patent Application No. 21900950.3 issued by the European Patent Office on May 27, 2024.

*Primary Examiner* — Jeremiah R Smith
(74) *Attorney, Agent, or Firm* — IP & T GROUP LLP

(57) ABSTRACT

A method for reducing waste by recovering a lithium precursor including: a) mixing a waste lithium secondary battery positive electrode material with urea to prepare a first mixture; b) firing the first mixture to prepare a second mixture; and c) subjecting the second mixture to water washing to obtain lithium hydroxide.

8 Claims, 1 Drawing Sheet

(51) Int. Cl.
  *H01M 6/52*   (2006.01)
  *H01M 10/052*  (2010.01)

(56) References Cited

U.S. PATENT DOCUMENTS

2021/0324495 A1*  10/2021  Rohde ................. C22B 23/0415
2022/0136084 A1*   5/2022  Rohde ....................... C22B 3/44
                                                                205/771
2022/0274841 A1*   9/2022  Rohde ................... C01D 15/02

FOREIGN PATENT DOCUMENTS

| CN | 111333123 | A  | 6/2020  |
| CN | 111600089 | A  | 8/2020  |
| CN | 111600090 | A  | 8/2020  |
| JP | H8-115752 | A  | 5/1996  |
| KR | 10-1682217 | B1 | 12/2016 |
| KR | 10-1731213 | B1 | 4/2017  |
| KR | 10-1802071 | B1 | 11/2017 |
| KR | 10-1828168 | B1 | 2/2018  |
| KR | 10-2020-0096965 | A | 8/2020 |
| WO | 2019/121086 | A1 | 6/2019  |
| WO | 2020/011765 | A1 | 1/2020  |

* cited by examiner

METHOD FOR RECOVERING LITHIUM PRECURSOR FROM WASTE LITHIUM SECONDARY BATTERY POSITIVE ELECTRODE MATERIAL

CROSS-REFERENCE TO RELATED APPLICATION

This application is a national phase entry under 35 USC 371 of International Patent Application No. PCT/KR2021/017806, filed on Nov. 30, 2021, which claims priority to Korean Patent Application No. 10-2020-0166203 filed on Dec. 2, 2020. The entire disclosure of each of the foregoing applications is incorporated herein by reference in its entirety.

BACKGROUND

Field of the Invention

The present disclosure relates to a method for reducing waste by recovering a lithium precursor from a waste lithium secondary battery positive electrode material.

Related Art

As the lithium secondary battery market expands to various fields such as batteries for information technology (IT) devices, electric vehicles, and energy storage systems (ESS), the demand for the lithium secondary battery has increased. In accordance with an increase in demand, the amount of waste lithium secondary batteries has also increased.

A positive electrode material accounts for more than 60% of the cost of the lithium secondary battery. Lithium cobalt oxide ($LiCoO_2$), which has an excellent reversibility, a low self-discharge rate, a high capacity, and a high energy density, is relatively easy to synthesize and has been used as the positive electrode material. In addition, in order to reduce the amount of expensive cobalt used, lithium has been used in the form of complex oxides such as lithium nickel cobalt manganese oxide ($Li(Ni, Co, Mn)O_2$) containing Ni and Mn, lithium manganese oxide ($LiMnO_2$), and lithium iron phosphate oxide ($LiFePO_4$). Since the positive electrode material (as described above) lithium in an amount of 5 to 7 parts by weight, a method for recovering a lithium compound from a waste lithium secondary battery positive electrode material has attracted significant attention.

As a technique for recycling lithium using a waste lithium secondary battery positive electrode material in the related art, a process of extracting a waste positive electrode material (with strong acids such as hydrochloric acid, sulfuric acid, and nitric acid) and then neutralizing the extracted waste positive electrode material with an alkali to precipitate and recover cobalt, nickel, and the like with a hydroxide has been used. Alternatively, a process of dissolving a positive electrode material with sulfuric acid or nitric acid in the presence of hydrogen peroxide and then separating and recovering metals by neutralization precipitation has been used. However, since a strong acid is used in the related art extraction processes, serious environmental pollution due to evaporation of the acid into the air occurs resulting in negative consequences, in particular, corrosion of equipment by the acid.

In order to address the environmental pollution, a method for recovering lithium, cobalt, nickel, and the like by simply mixing a waste positive electrode material with carbon powder and performing a heat treatment in an oxidizing or reducing atmosphere has been introduced. However, this method incurs the cost due to a heat treatment at a high temperature of 600° C. or higher and further a recovery rate of lithium is low as a result of a relatively low leaching efficiency compared to the recovery method noted above using a strong acid.

SUMMARY

One embodiment of the present disclosure provides a method for recovering lithium hydroxide from a waste lithium secondary battery positive electrode material with a high yield at a low temperature and the method provides reclamation in a more environmentally friendly way than the ways discussed above, thereby both reducing the environments impact caused by existing secondary battery reclamation and removing an impediment to the expanding use of secondary batteries.

In one general aspect, a method for recovering a lithium precursor includes:
  a) mixing a waste lithium secondary battery positive electrode material with urea to prepare a first mixture;
  b) firing the first mixture to prepare a second mixture containing lithium hydroxide; and
  c) subjecting the second mixture to water washing to separate a lithium precursor.

According to one aspect, the firing temperature may be 450° C. to 600° C.

According to one aspect, the step b) may be performed in an inert gas atmosphere.

According to one aspect, the water washing may be performed at 20° C. to 90° C.

According to one aspect, a lithium hydroxide aqueous solution may be produced through the water washing.

According to one aspect, the step c) may further include crystallizing lithium hydroxide.

According to one aspect, the urea may be mixed in an amount of 5 to 50 parts by weight with respect to 100 parts by weight of the positive electrode material.

According to one aspect, the positive electrode material may be represented by the following Chemical Formula 1:

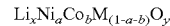 [Chemical Formula 1]

wherein, in Chemical Formula 1, M is selected from the group consisting of Mn, Na, Mg, Ca, Ti, V, Cr, Cu, Zn, Ge, Sr, Ag, Ba, Zr, Nb, Mo, Al, Ga, and B, $0<x\leq1.1$, $2\leq y\leq2.02$, $0.5\leq a\leq1$, and $0\leq b\leq0.5$.

According to one aspect, a recovery rate of lithium hydroxide from the waste lithium secondary battery positive electrode material may be 50% or more.

In one general aspect, a system for reducing waste by recovering a lithium precursor, the system comprising:
  a first mixer for mixing a waste lithium secondary battery positive electrode material with urea to prepare a first mixture;
  an oven for firing the first mixture to prepare a second mixture containing lithium hydroxide; and
  a second mixer for subjecting the second mixture to water washing to separate a lithium precursor.

According to one aspect, the oven is configured to control the firing temperature in a range from 450° C. to 600° C.

According to one aspect, the first mixer is configured to perform mixing in an inert gas atmosphere.

According to one aspect, the second mixer is configured to perform the water washing at temperatures ranging from ° C. to 90° C.

According to one aspect, in the second mixer, a lithium hydroxide aqueous solution is produced through the water washing.

According to one aspect, in the first mixer, the urea is mixed in an amount ranging from 5 to 50 parts by weight with respect to 100 parts by weight of the positive electrode material.

According to one aspect, in the first mixer, the positive electrode material is represented by the following Chemical Formula 1:

$$Li_xNi_aCo_bM_{(1-a-b)}O_y\qquad\text{Chemical Formula 1}$$

wherein, in Chemical Formula 1, M is selected from the group consisting of Mn, Na, Mg, Ca, Ti, V, Cr, Cu, Zn, Ge, Sr, Ag, Ba, Zr, Nb, Mo, Al, Ga, and B or a combination thereof, $0<x\leq1.1$, $2\leq y\leq2.02$, $0.5\leq a\leq1$, and $0\leq b\leq0.5$.

According to one aspect, in the second mixer, a recovery rate of lithium hydroxide from the waste lithium secondary battery positive electrode material is 50% or more.

According to one aspect, further comprising a mill for pulverizing the waste lithium secondary battery positive electrode material.

In one general aspect, a method for reducing waste by recovering a lithium precursor from a waste lithium secondary battery positive electrode material, the method comprising:

a) pulverizing the waste lithium secondary battery positive electrode material to produce a pulverized mixture containing lithium;
b) dry mixing the pulverized mixture with urea to produce a first mixture;
c) firing the second mixture to obtain a preliminary precursor mixture containing the lithium;
d) washing the second mixture in water to produce a lithium hydroxide.

As set forth above, the method for recovering a lithium precursor from a waste lithium secondary battery positive electrode material according to one embodiment of the present disclosure has an advantage of recovering lithium hydroxide with a high yield even at a low temperature of 600° C. or lower using urea as a reducing agent.

Further, lithium hydroxide may be efficiently recovered without using a strong acid such as sulfuric acid.

BRIEF DESCRIPTION OF THE DRAWINGS

The above and another aspects, features and advantages of the subject matter of the present disclosure will be more clearly understood from the following detailed description taken in conjunction with the accompanying drawing(s).

DETAILED DESCRIPTION

Figure 1:
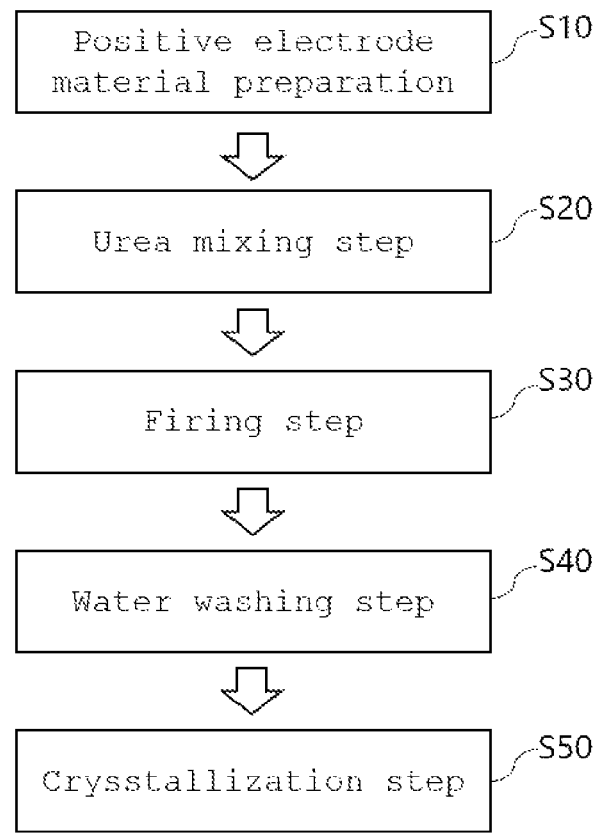
FIG. 1 is a flowchart illustrating a lithium precursor recovery method according to one embodiment of the present disclosure.
Figure 2:
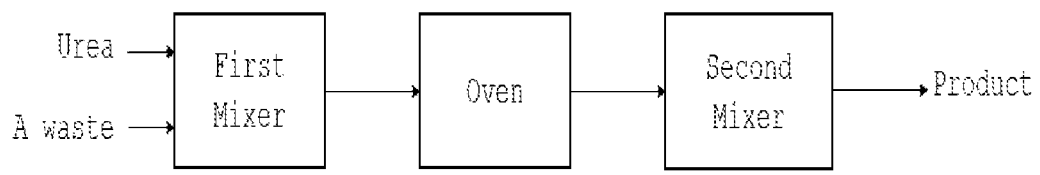
FIG. 2 is a flowchart illustrating a lithium precursor recovery system according to one embodiment of the present disclosure.

The advantages and features of the present disclosure and the associated methods will become apparent from the embodiments below described in detail with the accompanying drawing(s). However, the present disclosure is not limited to the embodiments disclosed below, but may be implemented in various and different forms. Specific contents for implementing the present disclosure will be described in detail with reference to the accompanying drawings. The same reference numerals refer to the same components regardless of the drawings. The term "and/or" includes any and all combinations of one or more of the listed items.

Unless defined otherwise, all terms (including technical and scientific terms) used in the present specification have a plain and ordinary meanings as commonly understood by those skilled in the art to which the present invention pertains. Throughout the present specification, unless explicitly described to the contrary, "comprising" any components will be understood to imply further inclusion of other components rather than the exclusion of any other components. In addition, singular forms are intended to include plural forms, unless the context clearly indicates otherwise.

In the present specification, it will be understood that when an element, such as a layer, a film, a region, a plate, or the like, is referred to as being "on" or "above" another element, it may be directly on another element or may have an intervening element present therebetween.

The term "precursor" used in the present specification is used to comprehensively refer to a compound containing a specific metal to provide the specific metal contained in an electrode active material.

Batteries for IT devices such as a laptop computer and a smartphone have led the lithium secondary battery market in the past, but recently high-capacity lithium secondary batteries are leading the market due to the rapid growth of the electric vehicle market. With the rapid growth of the high-capacity lithium secondary battery market, lithium hydroxide (which may increase the capacity of the lithium secondary battery and which is synthesized with nickel) has been used as a main raw material. Specifically, nickel has a property of not synthesizing well with lithium at a high temperature. Accordingly, a "high nickel" positive electrode material having a high content of nickel can be made by synthesizing lithium hydroxide(s) having a lower melting point than lithium carbonate with nickel.

Accordingly, there is a trend to use lithium hydroxide as a main raw material for a high-capacity lithium secondary battery.

In accordance with this trend in the high-capacity lithium secondary battery market, the present disclosure provides a method for recovering a lithium precursor containing lithium hydroxide from a waste lithium secondary battery positive electrode material. Specifically, in one embodiment, the recovery method includes the following operations of a) mixing a waste lithium secondary battery positive electrode material with urea to prepare a first mixture; b) firing the first mixture to prepare a second mixture containing lithium hydroxide; and c) subjecting the second mixture to water washing to separate a lithium precursor, and has an advantage of recovering lithium hydroxide with a yield of greater than 50% at a low temperature.

The operation a) of mixing a waste lithium secondary battery positive electrode material with urea, which is a solid reducing agent, and the recovery method may further include, before the mixing, an operation of obtaining a positive electrode material from a waste lithium secondary battery.

The waste lithium secondary battery may include a positive electrode, a negative electrode, and a separator interposed between the positive electrode and the negative electrode, and the positive electrode and the negative electrode may each include a positive electrode or negative electrode active material layer coated onto a positive electrode or negative electrode current collector. In one embodiment, the waste lithium secondary battery for material recovery may include a lithium secondary battery that cannot be reused (charged and discharged), for example, a lithium secondary battery whose charge and discharge performance is significantly reduced due to long-term use or a lithium secondary battery destroyed by physical impact or chemical reaction.

Lithium or a lithium derivative may be recovered by separating a positive electrode from the waste lithium secondary battery and recovering a waste positive electrode. The waste positive electrode may include a positive electrode current collector and a positive electrode active material layer, and the positive electrode active material layer may contain a positive electrode active material, a conductive material, and a binder. Specifically, the conductive material may include carbon-based materials such as for example graphite, carbon black, graphene, and carbon nanotubes, and the binder may include a vinylidene fluoride-hexafluoropropylene copolymer (PVDF-co-HFP), polyvinylidene fluoride (PVDF), polyacrylonitrile, and polymethylmethacrylate.

The recovered waste positive electrode may be subjected to a heat treatment in an oxidizing atmosphere at 100 to 500° C., and in an oxidizing atmosphere at 350 to 450° C. Accordingly, substantially all of the conductive material and the binder contained in the positive electrode active material layer may be removed, and may be removed to 95 wt % or more without limitation.

The waste positive electrode subjected to the heat treatment may be prepared in a powder form by detaching the positive electrode current collector through pulverization.

Specifically, in one embodiment, the waste positive electrode is pulverized, and then a positive electrode material may be obtained by using for example a 5 to 100 µm mesh screening. In one embodiment, the pulverization may be performed using a ball mill, but the present disclosure is not limited thereto.

In various embodiments, positive electrode current collector components are substantially removed through the process described above, and a positive electrode material (from which 90 wt % or more of the carbon-based components derived from the conductive material and the binder are removed) may be obtained.

In one embodiment, the positive electrode material may be represented by the following Chemical Formula 1:

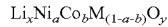   Chemical Formula 1 wherein, in Chemical Formula 1, M is selected from the group consisting of Mn, Na, Mg, Ca, Ti, V, Cr, Cu, Zn, Ge, Sr, Ag, Ba, Zr, Nb, Mo, Al, Ga, and B or a combination thereof, $0<x\leq1.1$, $2\leq y\leq2.02$, $0.5\leq a\leq1$, and $0\leq b\leq0.5$.

In operation a), a first mixture may be prepared by mixing the urea in an amount of 5 to 50 parts by weight, 7 to 30 parts by weight, and/or 10 to 25 parts by weight, with respect to 100 parts by weight of the positive electrode material. In one embodiment, the mixing may include dry mixing rather than mixing with a liquid material such as a solvent, and may be performed in a fluidized bed reactor. Specifically, the mixing may be performed at 15 to 90° C., and/or at 25 to 50° C. for 1 to 3 hours. As the first mixture prepared under the above conditions is fired and subjected to water washing, the positive electrode material is sufficiently reduced to increase a conversion rate to lithium hydroxide, such that lithium hydroxide may be recovered with a yield of greater than 50% after operation c).

Operation b) fires the prepared first mixture to prepare a second mixture, and may be performed at 450 to 600° C., and/or 470 to 600° C., and/or 500 to 550° C. for 1 to 4 hours and preferably 2 to 3 hours. In one embodiment, the firing may be performed in an inert gas atmosphere, and as a non-limiting example, the inert gas may contain argon or nitrogen. Specifically, the inside of the reactor may be replaced with an inert gas atmosphere through a method of purging the inert gas described above. When operation c) is performed after the firing under the above conditions, lithium hydroxide may be recovered with a recovery rate of 50% or more. In one embodiment, the recovery refers to a recovery rate of lithium hydroxide from the waste lithium secondary battery positive electrode material, and specifically, the recovery rate may be a value calculated by analyzing the total content of lithium in the positive electrode material before recovery for use as a reference of 100% and analyzing a content of lithium in the recovered lithium hydroxide.

The second mixture prepared in operation b) may contain lithium hydroxide (LiOH) and a transition metal-containing mixture. The transition metal-containing mixture may contain a transition metal and a transition metal-containing oxide, and the transition metal may include nickel, cobalt, magnesium, and the like. In one embodiment, the transition metal in the transition metal-containing mixture may be formed by separating the transition metal component in the process of converting the lithium composite oxide, which is the positive electrode material, into lithium hydroxide through the firing in operation b).

Operation c) subjects the prepared second mixture to water washing, and may be performed at 20 to 90° C. and/or at 20 to 60° C. Specifically, distilled water, pure water, or soft water may be used for example as a washing liquid for the water washing. In one embodiment, the second mixture and the washing liquid may be mixed at a solid-liquid ratio of 10 g/L to 500 g/L. The water washing may be repeated one to three times (or more), and a process time of one water washing event may range from 30 minutes to 2 hours. Under the above conditions, an aqueous solution containing lithium hydroxide may be separated from the second mixture. The transition metal-containing mixture in the second mixture may be precipitated in the aqueous solution, and a lithium precursor containing high-purity lithium hydroxide may be obtained through a filtration treatment.

Meanwhile, the transition metal-containing mixture separated by precipitation may be treated with an acid solution to form a precursor in the form of a transition metal salt. As a non-limiting example, sulfuric acid may be used as the acid solution to recover transition metal precursors $NiSO_4$, $MnSO_4$, and $CoSO_4$, respectively.

Operation c) may further include crystallizing lithium hydroxide in the separated aqueous solution. Specifically, crystalline lithium hydroxide may be obtained through a process of concentrating the aqueous solution. The concentration method may be selected and used without limitation as long as it may be used as a concentration method for obtaining a crystalline form in an aqueous solution, such as for example vacuum concentration, freeze concentration, evaporation concentration, heat concentration, precipitation concentration, and reverse osmosis concentration.

FIG. 1 is a flowchart for recovering a lithium precursor from a waste lithium secondary battery according to one embodiment of the present disclosure. As illustrated in FIG. 1, lithium hydroxide may be obtained from a waste lithium secondary battery positive electrode material through preparing a waste lithium secondary battery positive electrode material (S10); mixing the positive electrode material with a urea reducing agent (S20); firing the mixed positive electrode material and urea (S30); subjecting the fired product to water washing (S40); and crystallizing the water-washed product (S50). Through the above process, lithium hydroxide may be recovered with a recovery rate of 50% or more and/or 70% to 90%.

Hereinafter, the present disclosure will be described in detail with reference to Examples. However, while these Examples describe the present disclosure in more detail, the scope of the present invention is not limited by the following Examples.

EXAMPLES

Example 1

Operation 1: Preparation of Waste Lithium Secondary Battery Positive Electrode Material After a waste positive electrode separated from a waste lithium secondary battery was subjected to a heat treatment at 400° C. for 3 hours, the waste positive electrode was pulverized by milling and then sieved through a sieve having a mesh size of 80 μm, thereby obtaining a powdered positive electrode material. In this case, the positive electrode includes a positive electrode active material layer containing $LiNi_{0.8}Co_{0.1}Mn_{0.1}O_2$ as a positive electrode active material, Denka black as a conductive material, and polyvinylidene difluoride (PVDF) as a binder at a weight ratio of 92:5:3.

Operation 2: Recovery of Lithium Precursor from Waste Lithium Secondary Battery Positive Electrode Material 10 g of the positive electrode material obtained in operation 1 and 2 g of urea were dry mixed, and then the mixture was fired in a nitrogen atmosphere at 450° C. for 2 hours, thereby obtaining a preliminary precursor mixture. Next, the preliminary precursor mixture was recovered, distilled water was added to the recovered mixture in an amount equal to 19 times the weight of the recovered mixture, and contents of the respective lithium compounds obtained by analyzing the concentration of lithium dissolved in the distilled water were measured. The results are summarized in Table 1.

Evaluation Examples: Evaluation of Yield of Lithium Hydroxide from Waste Lithium Secondary Battery

Examples 2 to 7

Processes were performed in the same manner as that of Example 1 except that the firing was performed at the firing temperatures shown in Table 1 instead of 450° C. in the step 2.

Comparative Examples 1 and 2

Processes were performed in the same manner as that of Example 1 except that solid carbon (carbon black, Denka) was used instead of urea and the firing was performed at the firing temperatures shown in Table 1 in the operation 2.

Lithium Hydroxide Weight X-Ray Diffraction Spectroscopy (XRD) Analysis

XRD analysis was performed on the products obtained by Examples 1 to 7 and Comparative Examples 1 and 2, and the contents of the materials were obtained from the crystal structure analysis by the Rietveld method based on the XRD results. The results are summarized in Table 1.

TABLE 1

|  | Reducing agent | Firing temperature (° C.) | Lithium conversion rate (%) | Lithium carbonate (wt %) | Lithium hydroxide (wt %) | Lithium oxide (wt %) | Recovery rate of lithium hydroxide (%) |
|---|---|---|---|---|---|---|---|
| Example 1 | Urea | 450 | 51 | 0 | 10.5 | 0 | 51 |
| Example 2 | Urea | 480 | 75 | 0 | 15.7 | 0 | 75 |
| Example 3 | Urea | 500 | 83 | 0 | 19.8 | 0 | 83 |
| Example 4 | Urea | 530 | 89 | 0 | 22.3 | 0 | 89 |
| Example 5 | Urea | 550 | 91 | 0 | 23.6 | 0 | 91 |
| Example 6 | Urea | 600 | 92 | 1.0 | 24.2 | 0 | 88 |
| Example 7 | Urea | 400 | 10 | 0 | 0 | 0 | 0 |
| Comparative Example 1 | Solid carbon | 450 | 6 | 0 | 0 | 0 | 0 |
| Comparative Example 2 | Solid carbon | 840 | 54 | 1.1 | 0 | 10.2 | 49 |

In Table 1, the lithium conversion rate represents the ratio of the content of lithium in the aqueous solution obtained in the water washing to the total content of lithium in the positive electrode material before the reaction, the contents (wt %) of the lithium carbonate, lithium hydroxide, and lithium oxide represent the contents with respect to the total weight of the preliminary precursor mixture obtained in the operation 2, and the recovery rate of lithium hydroxide represents the content of lithium in the recovered lithium hydroxide with respect to the total content of lithium in the positive electrode material before recovery.

As shown in Table 1, in Examples 1 to 6 in which the urea reducing agent was used, a higher recovery rate of lithium hydroxide was exhibited compared to Comparative Examples 1 and 2 in which the solid carbon reducing agent was used. In particular, under the firing condition in which the firing temperature was 450° C. or higher, and specifically, 450 to 600° C., the content of lithium hydroxide tended to increase with the increase in the firing temperature, and it was confirmed that a high recovery rate of lithium hydroxide of 50% or more was exhibited in all the cases. Meanwhile, when the firing temperature was lower than 450° C. (Example 7), the content of lithium hydroxide was reduced, and therefore, it could be appreciated that a preferred firing temperature was 450 to 600° C.

Meanwhile, in Comparative Example 1 in which solid carbon was used as a reducing agent, although a firing process was performed under the same conditions as those of Example 1, the contents of lithium hydroxide and lithium carbonate in the obtained product were zero. That is, in a case where solid carbon was used as a reducing agent, it could be appreciated that lithium hydroxide was not produced at all at a temperature of 450° C., and the conversion rate of lithium was also significantly low at 6%.

In Comparative Example 2 in which solid carbon was used as a reducing agent and the firing temperature was 840° C., it was confirmed that although lithium oxide was obtained as a preliminary precursor and lithium hydroxide was obtained with a final recovery rate of 49% through an additional process, a much higher temperature was required than in Examples according to the present invention.

The invention claimed is:

1. A method for reducing waste by recovering a lithium precursor, the method comprising:
    a) dry mixing a waste lithium secondary battery positive electrode material with urea reducing agent to prepare a first mixture;
    b) firing the first mixture to prepare a second mixture containing lithium hydroxide, wherein the firing is performed solely in an inert atmosphere and the firing temperature ranges from 450° C. to 650° C.; and
    c) mixing the second mixture with water to provide an aqueous solution containing a lithium precursor.

2. The method for reducing waste of claim 1, wherein the mixing the second mixture with water is performed at temperatures ranging from 20° C. to 90° C.

3. The method for reducing waste of claim 1, wherein a lithium hydroxide aqueous solution is produced through the mixing the second mixture with water.

4. The method for reducing waste of claim 1, wherein the subjecting further includes crystallizing lithium hydroxide.

5. The method for reducing waste of claim 1, wherein the urea is mixed in an amount ranging from 5 to 50 parts by weight with respect to 100 parts by weight of the positive electrode material.

6. The method for reducing waste of claim 1, wherein the positive electrode material is represented by the following Chemical Formula 1:

$$Li_xNi_aCo_bM_{(1-a-b)}O_y$$

wherein, in Chemical Formula 1, M is selected from the group consisting of Mn, Na, Mg, Ca, Ti, V, Cr, Cu, Zn, Ge, Sr, Ag, Ba, Zr, Nb, Mo, Al, Ga, and B, $0<x\leq1.1$, $2\leq y\leq2.02$, $0.5\leq a\leq1$, and $0\leq b\leq0.5$.

7. The method for reducing waste of claim 1, wherein a recovery rate of lithium hydroxide from the waste lithium secondary battery positive electrode material is 50% or more.

8. A method for reducing waste by recovering a lithium precursor from a waste lithium secondary battery positive electrode material, the method comprising:
    a) pulverizing the waste lithium secondary battery positive electrode material to produce a pulverized mixture containing lithium;
    b) dry mixing the pulverized mixture with urea reducing agent to produce a first mixture;
    c) firing the first mixture to obtain a preliminary precursor mixture containing the lithium, wherein the firing is performed solely in an inert atmosphere and the firing temperature ranges from 450° C. to 650° C.;
    d) mixing the preliminary precursor mixture with water to produce an aqueous solution containing lithium hydroxide.

* * * * *